(12) United States Patent
Smith et al.

(10) Patent No.: US 7,946,047 B2
(45) Date of Patent: May 24, 2011

(54) BELT RIB WEAR GAUGE

(75) Inventors: Benjamin Morgan Smith, Golden, CO (US); David S. Miller, Highlands Ranch, CO (US); Kent Van Oort, Lafayette, CO (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 12/586,696

(22) Filed: Sep. 25, 2009

(65) Prior Publication Data

US 2011/0072675 A1    Mar. 31, 2011

(51) Int. Cl.
*G01B 5/18* (2006.01)

(52) U.S. Cl. ............ 33/501.08; 33/501.45; 33/836; 33/203.11; 73/146

(58) Field of Classification Search .......... 33/501.45, 33/836, 501.08, 203.11; 73/146
See application file for complete search history.

(56) References Cited

U.S. PATENT DOCUMENTS

| | | | | |
|---|---|---|---|---|
| 1,601,407 | A * | 9/1926 | Murray | 33/542 |
| 1,928,528 | A * | 9/1933 | Gagnon | 33/542 |
| 2,229,124 | A * | 1/1941 | Phillips | 33/542 |
| 2,303,651 | A * | 12/1942 | Mason | 408/116 |
| 2,861,347 | A * | 11/1958 | Von Tarnik | 33/501.45 |
| 3,557,460 | A * | 1/1971 | McFarland et al. | 33/836 |
| 3,732,626 | A | 5/1973 | Miller, Jr. | 33/179.5 |
| 4,342,153 | A * | 8/1982 | Cole | 33/836 |
| 6,298,568 | B1 * | 10/2001 | Johnson et al. | 33/501.45 |
| 6,438,859 | B1 * | 8/2002 | Lynch | 33/613 |
| 6,813,842 | B2 * | 11/2004 | Wang | 33/501.45 |
| 6,931,744 | B1 * | 8/2005 | Ikerd et al. | 33/501.45 |
| 7,188,430 | B2 * | 3/2007 | Tange | 33/544.4 |
| 7,484,302 | B2 * | 2/2009 | James | 33/203.11 |

FOREIGN PATENT DOCUMENTS

| | | |
|---|---|---|
| EP | 1310761 A1 | 5/2003 |
| JP | 2000 074603 A | 3/2000 |

OTHER PUBLICATIONS

"Free Serpentine Belt Wear Gauge" (online); Sep. 23, 2009; XP002608745; URL:http://www.tbucketeers.com/topic/9702-free-serpentine-belt-wear-gauge/;Anonymous; one page.
"Free Car Serpentine Belt Wear Gauge"(online); Sep. 21, 2009; XP002608746; URL:http://slickdeals.net/forums/showthread.php?t=2034482; Anonymous; one page.
"Serpentine Belt Diagnostics, One in Five Vehicles Needs a New Belt" (online); Sep. 21, 2009; XP002608747; Gates Corporation; URL:http://www.gatesprograms.com.beltwear/; Anonymous; one page.
"New ACDelco Belt Wear Tool" (online); May 1, 2010; XP002608748; TechConnect Online news Blog; URL:http// www.sandyblogs.com.techconnect/2010/05/new-acdelco-belt-wear-tool.html>; Anonymous; 4 pages.

* cited by examiner

*Primary Examiner* — Christopher W Fulton
(74) *Attorney, Agent, or Firm* — J. A. Thurnau, Esq.; T. A. Dougherty, Esq.; P. N. Dunlap, Esq.

(57) ABSTRACT

A belt rib wear gauge comprising a body, an elongate member having a length and extending from the body, the elongate member having an arcuate surface, the elongate member further comprising a tactile surface cooperatively disposed with respect to the arcuate surface, and the arcuate surface having a predetermined radial dimension wherein engagement of the elongate member within a belt groove and the position of the tactile surface relative to a datum plane at a tip of belt ribs disposed immediately adjacent to the belt groove indicates a state of wear of the belt ribs.

3 Claims, 4 Drawing Sheets

BELT RIB WEAR GAUGE

FIELD OF THE INVENTION

The invention relates to a belt rib wear gauge, and more particularly, to a belt rib wear gauge comprising an arcuate surface having a predetermined radial dimension wherein engagement of the elongate member within a belt groove and the position of the tactile surface relative to a datum plane at a tip of belt ribs disposed immediately adjacent to the belt groove indicates a state of wear of the belt ribs.

BACKGROUND OF THE INVENTION

Serpentine drive belts are becoming increasingly durable due to the use of EPDM materials. As a result, a normally reliable indicator of belt wear, cracking, is occurring less frequently although belts are still wearing. Such wear is difficult to visually diagnose and can lead to performance problems in the accessory belt drive system, for example, slipping and noise.

Belt wear in multi-ribbed belts manifests as an increase in belt groove width and depth, which results from wear and reduction in size of the belt ribs adjacent to the groove.

Representative of the art is U.S. Pat. No. 3,732,626 (1973) to Miller, Jr. which discloses an involute-spline, wear-step measurement gage comprising three coaxial and relatively rotatable splines. Springs are provided to bias a first spline in one rotary direction and the other two splines in the opposite direction when the gage has been placed on or in the spline to be measured and actuated. The first spline engages the unworn (non-drive) surface of the spline being measured and the other two splines are of different radial dimensions so that one of them engages the wear step and the other engages the unworn portion of the original involute, i.e., the form clearance, adjacent the wear step. A dial indicator arrangement registers the difference in positioning of these latter two splines in terms of the magnitude of the wear step.

What is needed is a belt wear gauge comprising an arcuate surface having a predetermined radial dimension wherein engagement of the elongate member within a belt groove and the position of the tactile surface relative to a datum plane at a tip of belt ribs disposed immediately adjacent to the belt groove indicates a state of wear of the belt ribs. The present invention meets this need.

SUMMARY OF THE INVENTION

The primary aspect of the invention is a belt wear gauge comprising an arcuate surface having a predetermined radial dimension wherein engagement of the elongate member within a belt groove and the position of the tactile surface relative to a datum plane at a tip of belt ribs disposed immediately adjacent to the belt groove indicates a state of wear of the belt ribs.

Other aspects of the invention will be pointed out or made obvious by the following description of the invention and the accompanying drawings.

The invention comprises a belt rib wear gauge comprising a body, an elongate member having a length and extending from the body, the elongate member having an arcuate surface, the elongate member further comprising a tactile surface cooperatively disposed with respect to the arcuate surface, and the arcuate surface having a predetermined radial dimension wherein engagement of the elongate member within a belt groove and the position of the tactile surface relative to a datum plane at a tip of belt ribs disposed immediately adjacent to the belt groove indicates a state of wear of the belt ribs.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
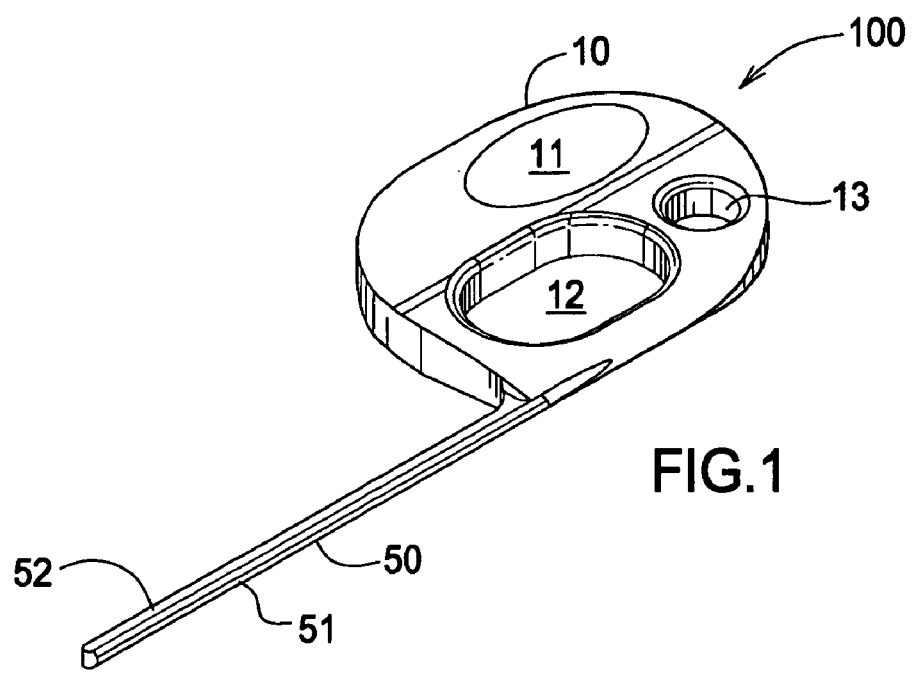
FIG. 1 is a perspective view of the gauge.

FIG. 1 is a perspective view of the gauge. The gauge 100 comprises an elongate wear measuring member 50 extending from a body 10. Member 50 comprises an arcuate wear measuring surface 51. Surface 51 typically comprises a semi-cylinder with a square top comprising a flat tactile surface 52. However, surface 51 may comprise in cross-section any geometric form which allows the gauge to contact the sides of a belt groove.

Figure 2:
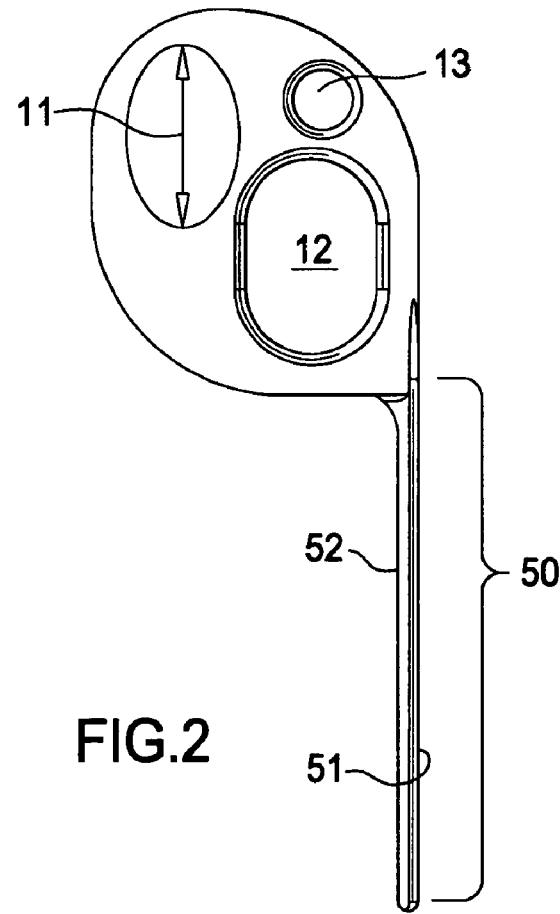
FIG. 2 is a side view of the gauge.

FIG. 2 is a side view of the gauge. Arcuate surface 51 extends substantially along the entire length of the gauge member 50, see FIG. 5. The form of the arcuate surface 51 is based on the "measuring pin" method of inspecting power transmission pulleys, known in the art. Namely, when placed in a belt groove (G) see FIGS. 6-9, the deeper member 50, and thereby surface 51, drops into a belt groove the more worn the belt.

Figure 3:
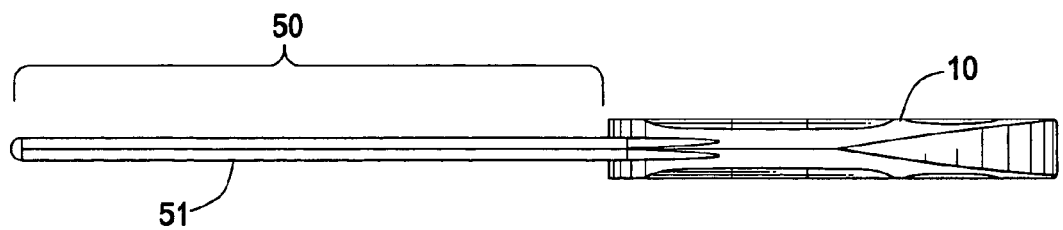
FIG. 3 is a bottom view of the gauge.

FIG. 3 is a bottom view of the gauge. Body 10 is slender in order to facilitate handling and engagement of the gauge with a belt groove. Gauge 100 is overall generally long and slender in order to facilitate use.

Figure 4:
FIG. 4 is an end view of the gauge.

FIG. 4 is an end view of the gauge. Member 50 is projects from a "tangent" position on an edge of body 10 as opposed to projecting on a radial from a body center.

Figure 5:
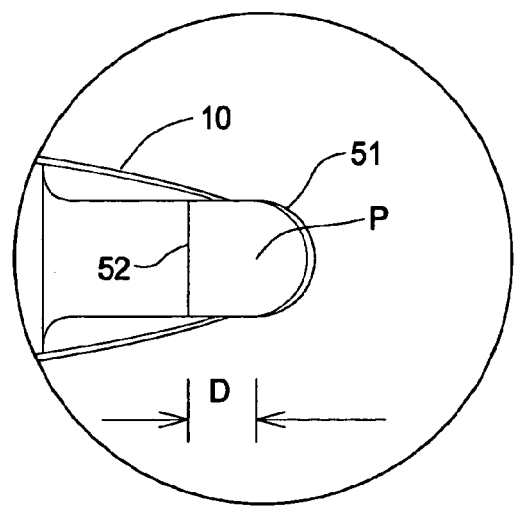
FIG. 5 is a detail of FIG. 4.

FIG. 5 is a detail of FIG. 4. Tactile surface 52 is disposed a predetermined distance D from the radius point P for arcuate surface 51. When the gauge member 50 is engaged with a belt groove (G) distance (D) corresponds to a proper position of surface 52 with respect to the tops of adjacent ribs (R) for an unworn belt, see FIGS. 8 and 9.

For an unworn belt surface 52 is disposed a distance D2 above a datum line T which is represented by the tops of adjacent ribs R. Distance D2 may be greater than +0.0 mm.

In the case of a worn belt, surface 52 will fall below a datum line T a distance D3. This is because the position of the worn groove walls GW have receded from the position of new groove walls GN from wear, thereby making the groove (G) wider.

Figure 6:
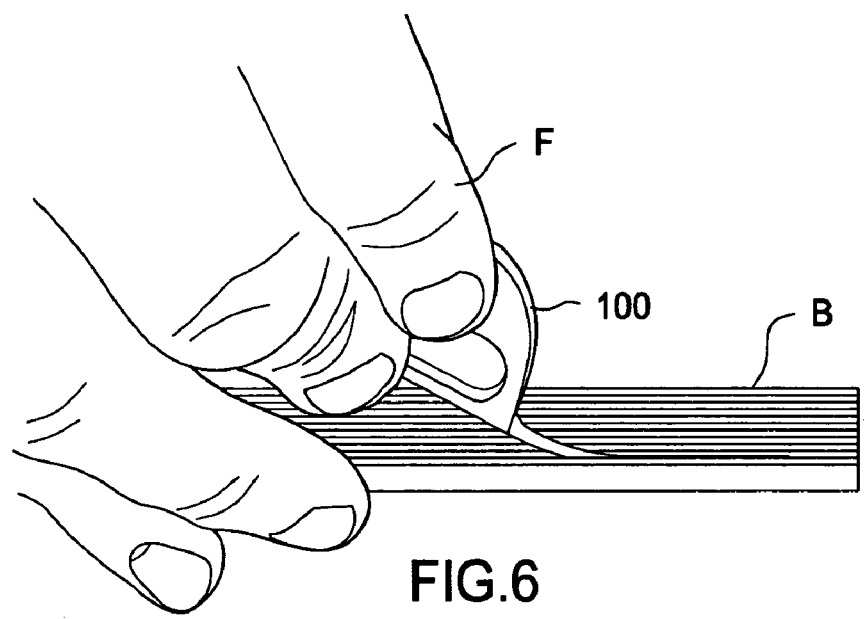
FIG. 6 shows the gauge in use.

FIG. 6 shows the gauge in use. In use, the gauge can be effectively used to measure relative belt wear by using sight or feel by a user to determine how far the arcuate surface 51 drops in the belt groove between the belt ribs. Both visual and feel or tactile methods of wear inspection benefit from the tactile surface 52 of the member 50, namely, the flat top surface 52. Surface 52 is flat and squared to provide a tactile surface to feel and/or see when inspecting serpentine multi-ribbed belts for wear.

The gauge body or handle 10 is ideally formed to enable belt inspections with the belt installed on the engine, as well as when it is removed from an engine. Member 50 is flexible to provide further visual confirmation of proper engagement.

A small detent 11 on each side of the body 10 provides a means to grip the gauge thereby allowing the measuring member 50 be properly engaged with a belt groove.

Figure 7:
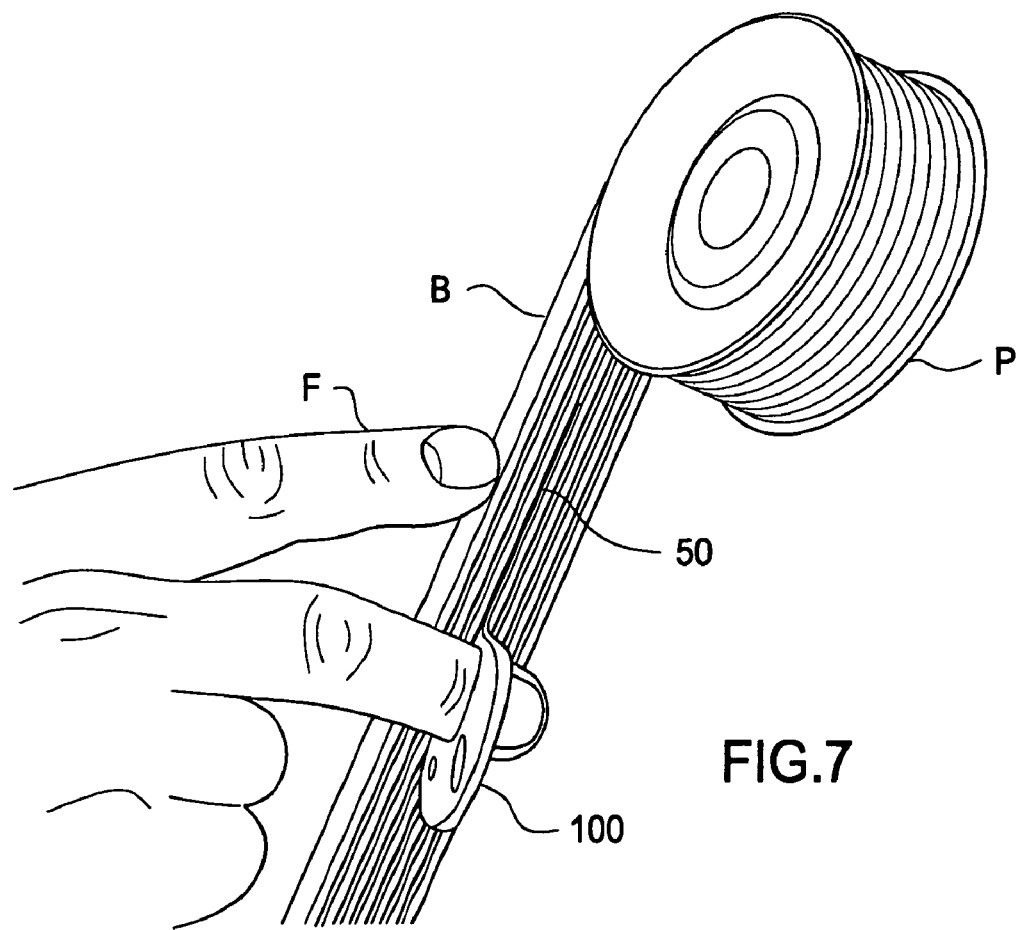
FIG. 7 shows the gauge in use.

FIG. 7 shows the gauge in use. For belt inspections where the belt B is installed on the vehicle engaged with a pulley P, the need for "single handed" use is important due to the normally confined space in which the accessory drives and belts are located. To accomplish this, the device features a small finger hole 12 intended to fit on a users finger tip, but not beyond the first knuckle of the pointer, middle, or ring finger. This allows a user to orient the gauge as needed to inspect a belt and secure the gauge to the finger of choice and use an adjacent finger (F) to feel for belt wear by feeling the relationship between the tactile surface 52 and the ribs adjacent to the groove in which the member 50 is engaged. Further, the body comprises a small hole 13 that can be used to attach a key chain or other similar retention item.

Figure 8:
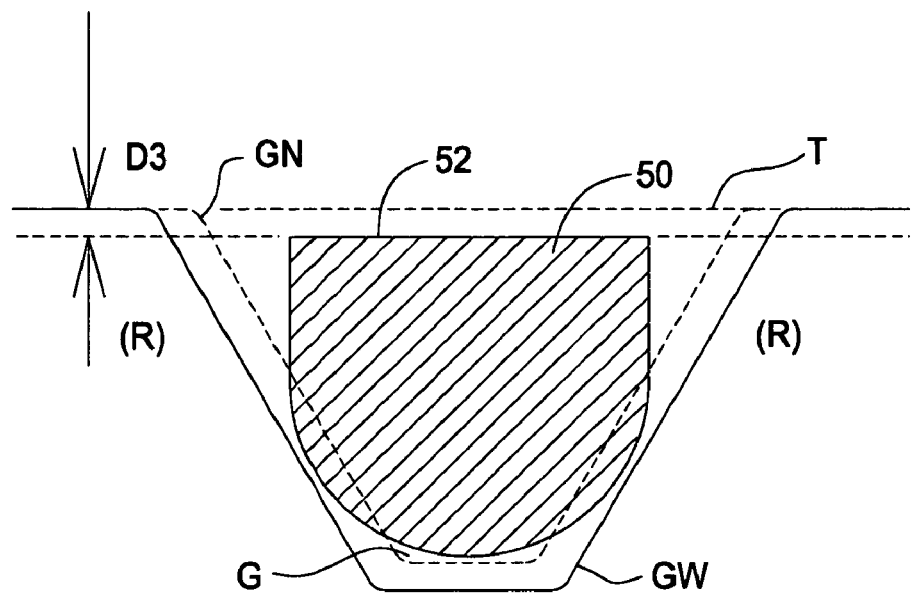
FIG. 8 is a cross-sectional schematic of the gauge in a worn belt groove.

FIG. 8 is a cross-sectional schematic of the gauge in a worn belt groove. Member 50 is shown engaged with a groove G in a worn belt. The worn groove surface GW has receded from the new groove surface position GN. Adjacent ribs (R) are disposed on each side of the groove G. A datum line T extends between the tops of the adjacent ribs R. Member 50 is shown in cross-section. Member 50 is shown recessed within groove G. Surface 52 is disposed a distance D3 below datum T. Distance D3 can be greater than or equal to 0.0 mm.

Figure 9:
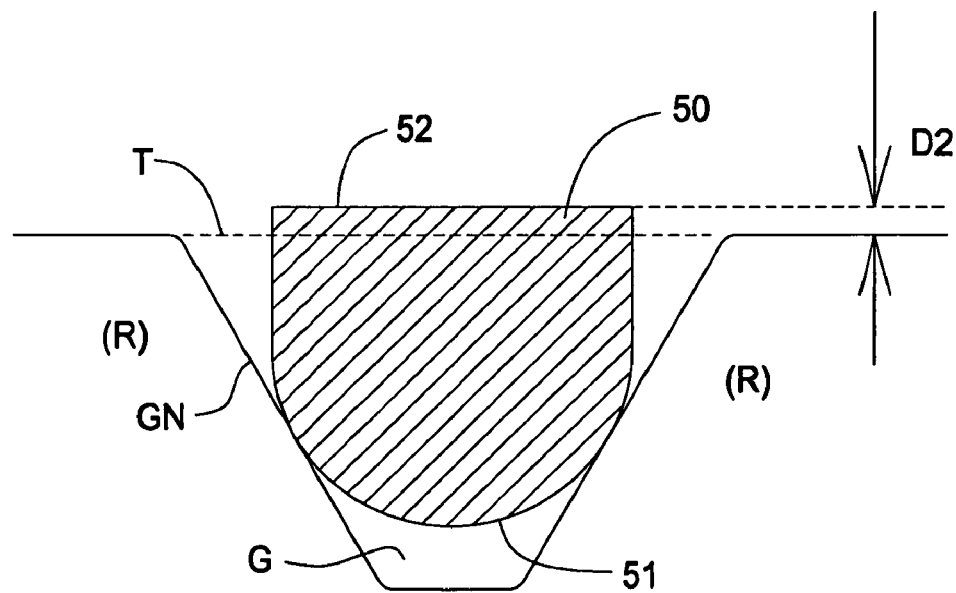
FIG. 9 is a cross-sectional schematic of the gauge in an unworn belt groove.

FIG. 9 is a cross-sectional schematic of the gauge in an unworn belt groove. Member 50 is shown engaged with a groove G in an unworn belt. The unworn belt groove surface is surface GN as shown in FIG. 8. Adjacent ribs (R) are disposed on each side of the groove G. Datum line T extends between the tops of the adjacent ribs R. Member 50 is shown in cross-section. Distance D2 can be greater than 0.0 mm.

Although a form of the invention has been described herein, it will be obvious to those skilled in the art that variations may be made in the construction and relation of parts without departing from the spirit and scope of the invention described herein.

We claim:

1. A gauge comprising:
   a body comprising a hole for receiving a user finger;
   an elongate member having a length and extending from the body;
   the elongate member having an arcuate surface;
   the elongate member further comprising a tactile surface cooperatively disposed with respect to the arcuate surface;
   the hole and the tactile surface proximately disposed such that a user can manipulate the gauge using a single hand to engage the hole and touch the tactile surface; and
   the arcuate surface having a predetermined radial dimension wherein engagement of the elongate member within a belt groove and the user sensed position of the tactile surface relative to a datum plane at a tip of belt ribs disposed immediately adjacent to the belt groove indicates a state of wear of the belt ribs.

2. The gauge as in claim 1, wherein the body comprises a detent.

3. The gauge as in claim 1, wherein the elongate member is flexible.

* * * * *